(12) United States Patent
Frame et al.

(10) Patent No.: US 7,010,629 B1
(45) Date of Patent: Mar. 7, 2006

(54) APPARATUS AND METHOD FOR COUPLING TO A MEMORY MODULE

(75) Inventors: David W. Frame, Aloha, OR (US); Christopher J. Banyai, Chandler, AZ (US); Karl H. Mauritz, Chandler, AZ (US); Albert R. Nelson, Olympia, WA (US); Quing-Lun Chen, Lakewood, WA (US); Hany M. Fahmy, University Pl., WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,542

(22) Filed: Dec. 22, 1999

(51) Int. Cl.
*G06F 13/00* (2006.01)

(52) U.S. Cl. .......................................... 710/100; 326/30
(58) Field of Classification Search ................. 710/100; 326/30; 439/941, 946, 948, 954
See application file for complete search history.

(56) References Cited

U.S. PATENT DOCUMENTS

| | | | | |
|---|---|---|---|---|
| 4,225,900 A | * | 9/1980 | Ciccio et al. ............... | 361/739 |
| 5,145,387 A | * | 9/1992 | Ichihashi ..................... | 439/108 |
| 5,334,962 A | * | 8/1994 | Higgins et al. ............. | 333/247 |
| 5,432,916 A | * | 7/1995 | Hahn et al. .................. | 710/103 |
| 5,467,455 A | * | 11/1995 | Gay et al. .................... | 710/101 |
| 5,663,661 A | * | 9/1997 | Dillon et al. ................. | 326/30 |
| 5,966,293 A | * | 10/1999 | Obermaier et al. ......... | 361/735 |
| 5,980,321 A | * | 11/1999 | Cohen et al. ............... | 439/608 |
| 6,067,594 A | * | 5/2000 | Perino et al. ............... | 710/126 |
| 6,067,596 A | * | 5/2000 | Nguyen et al. ............. | 710/129 |
| 6,078,978 A | * | 6/2000 | Suh ............................. | 710/129 |
| 6,081,430 A | * | 6/2000 | La Rue ....................... | 361/788 |
| 6,089,923 A | * | 7/2000 | Phommachanh ............ | 439/676 |
| 6,128,201 A | * | 10/2000 | Brown et al. ............... | 361/784 |
| 6,139,371 A | * | 10/2000 | Troutman et al. ........... | 439/676 |
| 6,230,245 B1 | * | 5/2001 | Manning ..................... | 711/167 |
| 6,310,392 B1 | * | 10/2001 | Burns ......................... | 257/723 |

\* cited by examiner

*Primary Examiner*—Xuan M. Thai
(74) *Attorney, Agent, or Firm*—Kenneth M. Seddon

(57) ABSTRACT

Briefly, in accordance with one embodiment of the invention, a system includes two boards coupled by a bus. The bus having a dual-terminated transmission line that communicatively couples a memory control hub with a memory repeater hub that each have a Rambus ASIC Cell (RAC). Briefly, in accordance with another embodiment of the invention, a connector has two metal traces that are of different lengths. The parasitic capacitance of the longer metal trace is increased so that the impedance of the two metal traces is substantially equal.

17 Claims, 3 Drawing Sheets

APPARATUS AND METHOD FOR COUPLING TO A MEMORY MODULE

BACKGROUND

Within some computing systems, integrated circuits (e.g., processors and memory devices) may have a need to interact with each other, even though the integrated circuits may be physically located on different printed circuit boards. A technique to communicatively couple integrated circuits that are on different boards has been proposed by Rambus, Inc. of Mountain View, Calif. The "Direct RAC Data Sheet," dated Aug. 7, 1998 how a Direct Rambus™ ASIC Cell (Direct RAC) module may be used to control the transmission of data between a processor and a memory module. See also, "Direct Rambus Clock Generation Validation" version 1.0, July 1999, available at http://www.rambus.com.

The processor may include a RAC module that controls communication over a Rambus Channel that may comprise a plurality of lines. In the Rambus specification, each line in the Rambus Channel has an impedance value of 28 Ohms. The specification also provides for the use of connectors to connect a memory module to a printed circuit board containing a processor. However, the currently available connectors that may be used to connect memory modules to the Rambus Channel place the memory module at a right angle relative to the channel. Consequently, the memory modules extend at a right angle from the printed circuit board that contains the processor.

Although this configuration may be well suited to desktop applications, conventional implementations in accordance with the Rambus specification are not well suited for applications that have small form factors, for example, portable computing applications. Moreover, the current Rambus specification specifies that the Rambus Channel is to have an impedance value of 28 Ohms. This specification may impose a limitation on the number of memory modules or repeater hubs that may be coupled to the Rambus Channel due to fan-out issues.

Thus, there is a continuing need for better ways to communicatively couple processors to memory modules.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
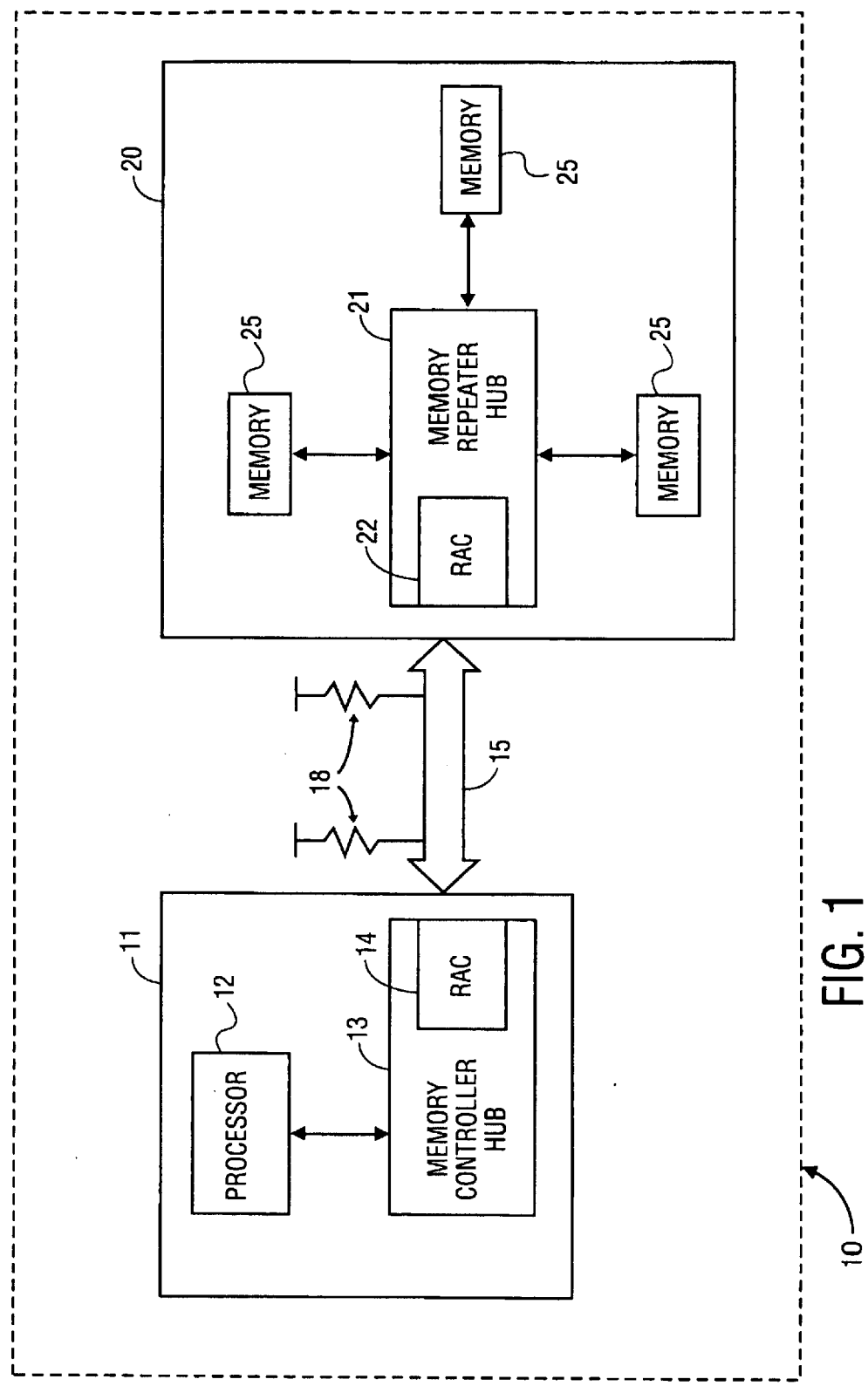
FIG. 1 is a block diagram representation of an embodiment of a system having a communication bus in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

FIG. 1 is a block diagram representation of a computing system 10 in accordance with an embodiment of the present invention. Computing system 10 may be a variety of apparatuses, including without limitation, a portable computing system, a desktop computing system, and the like. Computing system 10 may include a computing board 11 that is communicatively coupled to a memory mezzanine 20. Memory Mezzanine 20 may comprise storage mediums that are accessed by a processor, and may be, for example, a memory expansion module, a memory card, and the like, although the scope of the present invention is not limited to these examples. Computing board 11 may include a variety of integrated circuits, such as a processor 12, that are coupled to a memory controller hub (MCH) 13. In this embodiment, MCH 13 may be an 82840® processor, which is available from Intel Corporation, Santa Clara, Calif.

MCH 13 may assume responsibility for sending and receiving data between processor 12 and memory mezzanine 20. Although this is not intended to be a limitation of the scope of the present invention, MCH 13 may include a Rambus ASIC Cell (RAC) 14, such as a Direct Rambus™ Rambus ASIC Cell that serves as a communication controller. It should be understood that the scope of the present invention is not limited to computing systems that implement the Rambus communication protocol. Alternative communication modules may be used to control the exchange of data signals between a processor and a storage medium, such as a disk drive, memory module, or the like, that may or may not be Rambus™ compatible.

Memory mezzanine 20 may also include a variety of integrated circuits such as a memory repeater hub (MRH) 21 that may be coupled to memory device(s) 25. As shown, MRH 21 may include a RAC 22 that is communicatively coupled to RAC 14 so that data and instructions may be exchanged between computing board 11 and memory mezzanine 20. The process and protocols for exchanging information are provided in the aforementioned Rambus "Direct RAC Data Sheet."

In this embodiment, memory mezzanine 20 includes a plurality of memory devices 25 that may be used by processor 12 to store data. Although the scope of the present invention is not limited in this respect, memory devices 25 may be, for example, a Rambus Dynamic Random Access Memory (RDRAM), a Rambus In-Line Memory Module (RIMM), a Dual In-Line Memory Module (DIMM), a Synchronous-clocked Dynamic Random Access Memory (SDRAM), Double Data Rate DRAM (DDR), another MRH, etc.

A bus 15 may communicatively couple RAC 14 to a RAC 22. In this embodiment, bus 15 comprises a dual-terminated transmission line that may include one or more signal lines that are used by MCH 13 and MRH 21 to exchange data. For example, as specified by the Rambus standard, bus 15 may comprise multiple lines that communicate signals such as data signals, clock signals, parity signals, reset signals, handshaking signals, and the like. It should, however, be appreciated that the scope of the present invention is not limited to transmitting signals of only this or any other type. Typically, bus 15 has at least 10 signal lines and may have 32 lines as dictated by the Rambus specification.

In this embodiment, bus 15 may included at least two resistors 18, one adjacent to each of computing board 11 and memory mezzanine 20, respectively. Resistors 18 are positioned near the ends of bus 15 to reduce the amount of reflection that occurs when communication/transmission signals reach the either end of bus 15. The resistance value of resistors 18 may be determined by a variety of parameters such as the impedance of bus 15, the clock rate at which data is broadcasted over bus 15, the relative strength of the data signals, and the sensitivity of RAC's 14 and 22. Resistors 18 may have a resistance value ranging from approximately 25 ohms to 65 ohms so that the resistance value of resistors 18 is about 7–12% higher or lower than the impedance value of bus 15. In one embodiment, bus 15 may have an impedance value of about 50 Ohms and resistors 18 may have a resistance value of about 55 Ohms. However, the scope of the present invention is not limited to the values recited above as bus 15 may have an impedance ranging from about 45 Ohms to 55 Ohms, or even, 45 Ohms to 65 Ohms. Furthermore, embodiments of the present invention may be used in computing systems where the impedance of bus 15 is about 28 Ohms, or has an impedance value ranging from about 25 ohms to 35 ohms.

Conventional Rambus specifications require that the impedance of the bus lines be about 28 Ohms, which as explained above, may serve to limit the data rate and fan-out of memory devices that may be coupled to the bus. However, the bus of this embodiment of the present invention addresses at least some of these limitations. This embodiment, for example, may be used to provide source-synchronous communication between two devices at data rates that are much faster than may have been previously possible. For example, bus 15 is adapted to provide a clock signal at a rate in excess of 250 MHz, and is well-suited to provide a clock signal at a rate ranging from about 300 MHz to 400 MHz, and even, about 300 MHz to 800 MHz. With these clock speeds and data bus widths, it may be possible to transmit data signals across bus 15 at a rate in excess of 1 Gbytes/sec, for example.

Figure 2:
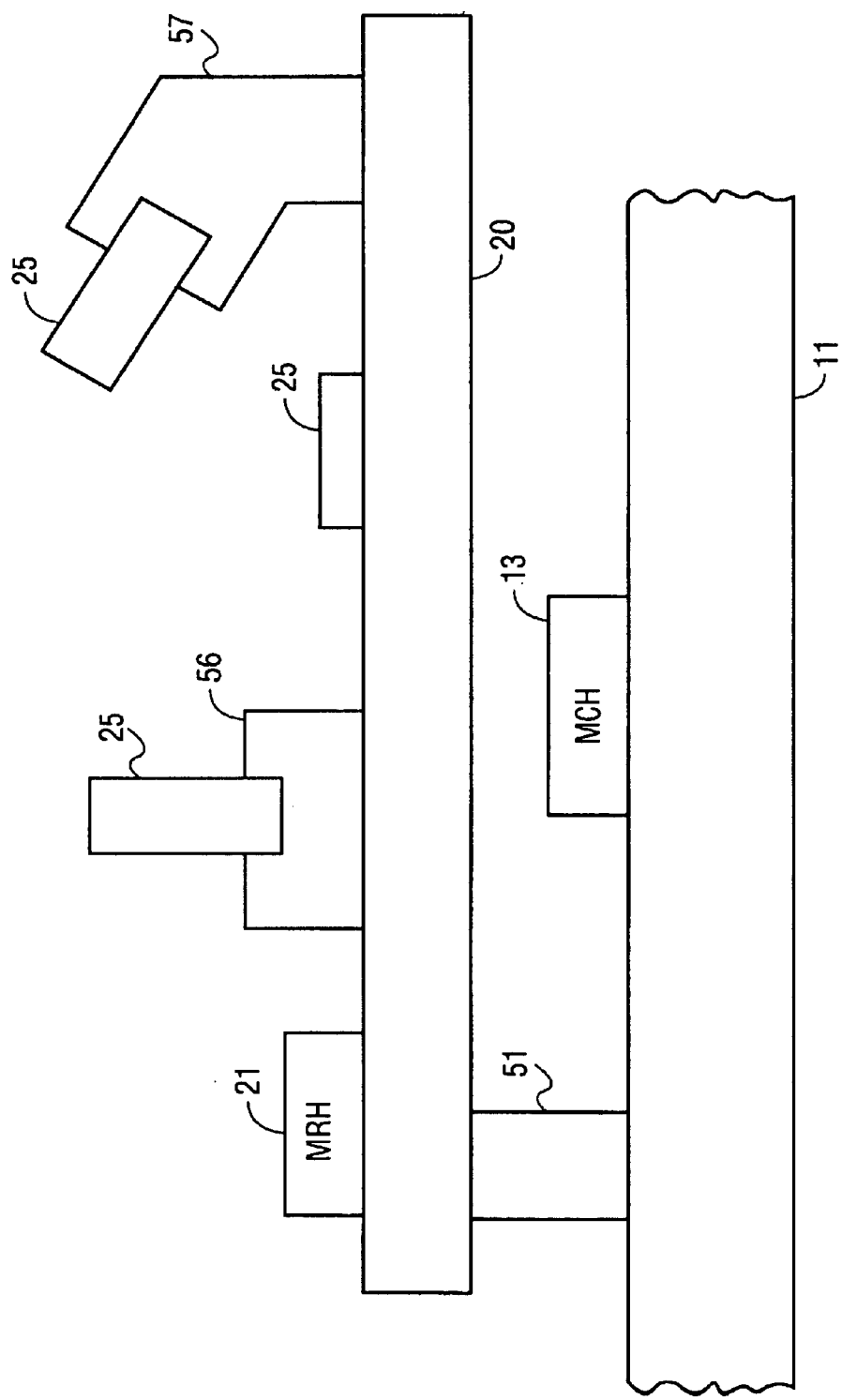
FIG. 2 is a sectional representation of a memory mezzanine and a printed circuit board in accordance with an embodiment of the present invention.

In the embodiment illustrated in FIG. 1, RAC's 14 and 22 are directly connected together by bus 15. However, it should also be understood that in alternative embodiments of the present invention, it is possible to use a connector(s) to couple computing board 11 and memory mezzanine 20. As shown in FIG. 2, a connector 51 may be used to couple computing board 11 to memory mezzanine 20. FIG. 2 is also provided to illustrate examples of how memory devices 25 may be coupled to memory mezzanine 20. As shown, a connector 56 may be used to connect a memory device 25 at a right angle to memory mezzanine 20, or a memory device 25 may be directed mounted onto memory mezzanine 20. Likewise, a connector 57 may be used to connect memory device 25 at an angle relative to memory mezzanine 20. Although not shown, in alternative embodiments, memory devices 25 may be directly mounted to computing board 11 using one of the same or similar techniques used to connect to memory mezzanine 20.

Figure 3:
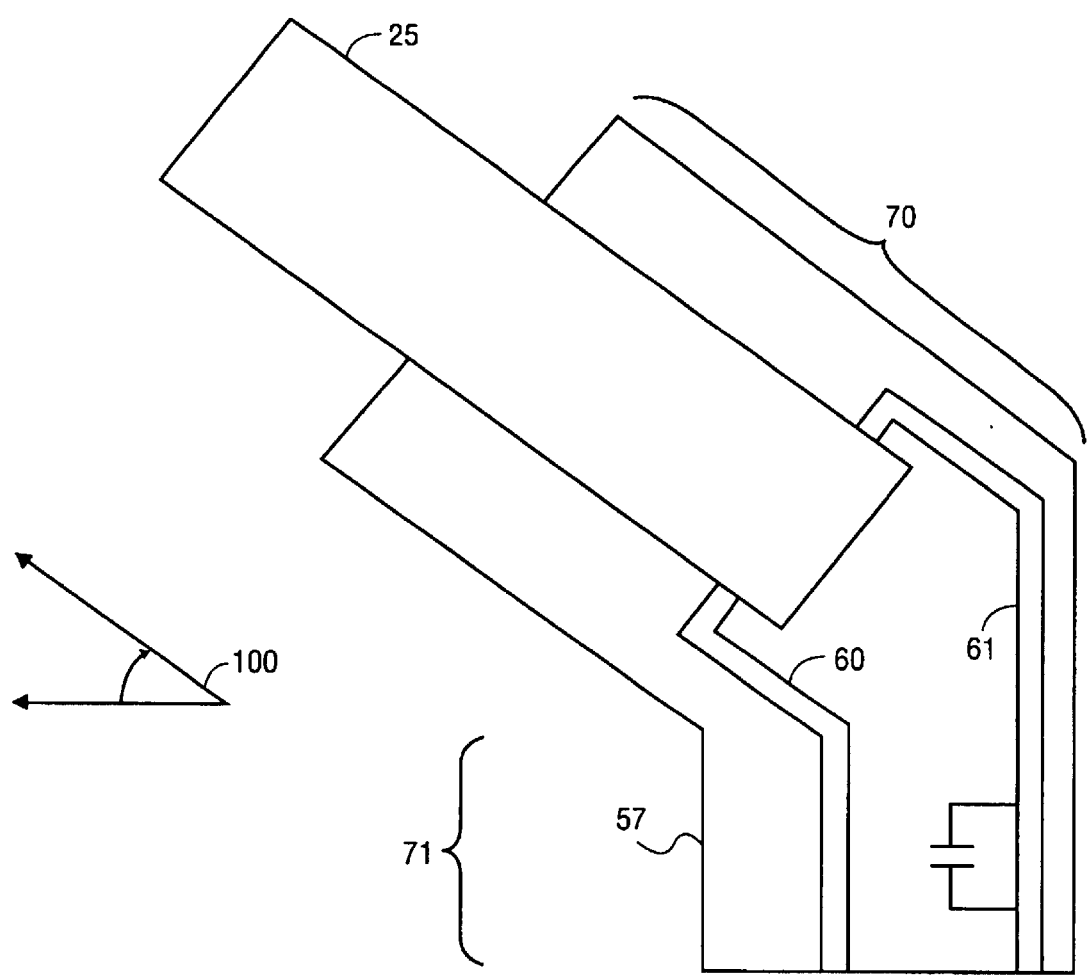
FIG. 3 is a sectional representation of a connector in accordance with an embodiment of the present invention.

FIG. 3 is a sectional view of connector 57, which may be desirable in applications that have small form factors, e.g., portable computers. As indicated with brackets 70 and 71, a portion (e.g., the portion indicated by bracket 70) of connector 57 is at an angle 100 relative to the body of connector 57 (e.g., the portion indicated by bracket 71). The magnitude of angle 100 may vary depending on the overall height desired for connector 57 and memory device 25. Connector 57 may be formed so that memory device 25 is at an angle of about 25 degrees relative to the surface of memory mezzanine 20. Furthermore, angle 100 may range from about 30 degrees to 40 degrees.

Connector 57 may include metal lines 60 and 61 that are used to communicatively couple to memory device 25. Although only two metal lines are shown in FIG. 3, the number of metal lines should not be considered a limitation of the present invention as the number of metal lines may increase, as desired, to provide communication with memory device 25. As shown in FIG. 3, metal line 61 is longer than metal line 62 as a result of the angle of connector 57. It has been discovered that slight variations in the length of each of the metal traces may significantly impact the amount of reflections that occur when data is transmitted to or received from memory device 25. This in turn, may impact the maximum rate at which data may be transferred through a connector.

Although a variation in impedance may be insignificant when data is transmitted at 100 MHz or less, the variation in impedance may become a severe limiting factor for data transfer rates of 200–400 MHz and becomes even more significant of a problem as the data rate approaches 800 MHz. In accordance with an aspect of the present invention, one technique for addressing the mismatch in the length of metal lines 60 and 61 is to increase the natural, parasitic capacitance value of the longer line, e.g., metal line 61. As shown by the formula, impedance=(inductance/capacitance)$^{1/2}$, the impedance of a metal line is directly proportional to the inductance of the line and inversely proportional to the capacitance of the line.

Therefore, any increase in the inductance of metal line 61 due to its additional length, may be offset by a proportionately equal increase in the capacitance value of the same line. The capacitance of metal line 61 may be increased in a variety of ways including, without limitation, by adjusting the physical shape of metal line 61, by adjusting the materials used to form metal line 61, by adjusting the property of the materials surrounding metal line 61, or by adding a discrete capacitor to metal line 61. By making the parasitic capacitance value of metal line 61 greater than the parasitic capacitance value of metal line 60, the impedance of metal line 61 may be reduced so that the impedance of metal line 61 may be substantially equal to the impedance of metal line 60. Thus, this embodiment of the present invention is contrary to the teachings of the art that call for minimizing the parasitic capacitance of any conductive line.

The speed at which data may be transmitted over data lines is dependent in part on any variation in impedance between lines that are used to transmit similar data. This becomes more of a concern as the data transfer rate is increased. Up to now, the problem in mismatched impedance has not been a significant issue because traditional data transfer rates of 66 MHz, 100 MHz, or 133 MHz are not significant enough to cause computing system to suffer from this problem. However, as data transfer rates approach upwards of 800 MHz, the problem may become more significant with angled connectors, and thus, the advantages of the embodiments of the present invention may become more apparent.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
   a first integrated circuit comprising a Direct Rambus™ ASIC Cell (Direct RAC);
   a second integrated circuit comprising a Direct RAC;
   a mezzanine card having a connector and comprising the second integrated circuit, wherein the connector is adapted to be communicatively coupled to a third integrated circuit, wherein the connector includes a first metal line and a second metal line, the second metal line being longer than the first metal line, and wherein the second metal line has a parasitic capacitance value greater than a parasitic capacitance value of the first metal line; and
   a dual-terminated transmission line, wherein the dual-terminated transmission line communicatively couples the Direct RAC of first integrated circuit with the Direct RAC of the second integrated circuit.

2. The apparatus of claim 1, wherein the dual-terminated transmission line includes a first resistor adjacent to the first integrated circuit and a second resistor adjacent to second integrated circuit.

3. The apparatus of claim 2, wherein the first resistor and the second resistor have a resistance value ranging from approximately 25 ohms to 65 ohms.

4. The apparatus of claim 3, wherein the dual-terminated transmission line has an impedance value, and the resistance value of the first resistor is about 7–12% higher than the impedance value of the dual-terminated transmission line.

5. The apparatus of claim 3, wherein the dual-terminated transmission line has an impedance value of about 50 ohms, and the first resistor has a resistance value of about 55 ohms.

6. The apparatus of claim 1, wherein the second integrated circuit comprises a memory repeater hub.

7. The apparatus of claim 1, wherein the first integrated circuit and the second integrated circuit are adapted to provide source-synchronous communication between each other.

8. The apparatus of claim 1, wherein the dual-terminated transmission line is adapted to provide a clock signal at a rate in excess of 250 MHz.

9. The apparatus of claim 8, wherein the dual-terminated transmission line is adapted to provide a clock signal at a rate ranging from about 300 MHz to 800 MHz.

10. The apparatus of claim 1, wherein impedance of the first metal line is substantially equal to impedance of the second metal line.

11. The apparatus of claim 10, wherein the connector has a first portion and a second portion, the second portion being at an angle ranging from about 30 degrees to 40 degrees relative to the first portion.

12. The apparatus of claim 11, wherein the second portion is at an angle of about 25 degrees relative to the first portion.

13. The apparatus of claim 1, wherein the third integrated circuit comprises a Rambus™ in-line memory module communicatively coupled to the connector.

14. An article comprising:
    a memory module including a connector that is adapted to be coupled to a first integrated circuit; and
    wherein the connector has a first line and a second line, the second line being longer than the first line, the second line having a capacitance value greater than a capacitance value of the first line, and wherein impedance of the second line is approximately equal to impedance of the first line.

15. The article of claim 14, further comprising:
    a second integrated circuit; and
    a transmission line adapted to communicatively couple the first integrated circuit and the second integrated circuit, wherein the transmission line has an impedance value ranging from about 25 ohms to 35 ohms.

16. The article of claim 14, further comprising:
    a second integrated circuit; and
    a dual-terminated transmission line adapted to communicatively couple the first integrated circuit and the second integrated circuit.

17. A method of making an article, comprising:
    providing a first integrated circuit having a communication module;
    providing a connector having a first line and a second line, wherein the first line and the second line are communicatively coupled to the first integrated circuit, and wherein the second line is longer than the first line, has a capacitance value greater than a capacitance value of the first line, and impedance of the second line is approximately equal to impedance of the first line;
    providing a second integrated circuit have a communication module; and
    forming a dual-terminated transmission line to couple the first integrated circuit to the second integrated circuit.

* * * * *